(12) United States Patent
Abe

(10) Patent No.: US 6,175,805 B1
(45) Date of Patent: Jan. 16, 2001

(54) NAVIGATION SYSTEM

(75) Inventor: Yuichi Abe, Tottori (JP)

(73) Assignees: Sanyo Electric Co., Ltd., Osaka-Fu; Tottori Sanyo Electric Co., Ltd., Tottori-Ken, both of (JP)

( * ) Notice: Under 35 U.S.C. 154(b), the term of this patent shall be extended for 0 days.

(21) Appl. No.: 09/290,490

(22) Filed: Apr. 12, 1999

(30) Foreign Application Priority Data

Apr. 22, 1998 (JP) .................................................. 10-112094

(51) Int. Cl.[7] .............................. G01C 21/20; G06G 7/78
(52) U.S. Cl. .......................... 701/209; 701/201; 701/207; 701/208; 701/213
(58) Field of Search .................................... 701/200–203, 701/207–210, 213–216

(56) References Cited

U.S. PATENT DOCUMENTS

| | | | |
|---|---|---|---|
| 5,684,704 | * 11/1997 | Okazaki | 701/208 |
| 5,862,509 | * 1/1999 | Desai et al. | 701/209 |
| 5,878,368 | * 3/1999 | DeGraaf | 701/209 |
| 5,908,464 | * 6/1999 | Kishigami et al. | 701/208 |

FOREIGN PATENT DOCUMENTS

| | | |
|---|---|---|
| 0 547 548 A1 | 6/1993 | (EP) . |
| 0 726 447 A1 | 2/1996 | (EP) . |
| 0 703 436 A2 | 3/1996 | (EP) . |
| 0 751 376 A2 | 1/1997 | (EP) . |
| 0 805 337 A2 | 5/1997 | (EP) . |
| 1-138409 | 5/1989 | (JP) . |

OTHER PUBLICATIONS

European Patent Office Communication dated Aug. 31, 1999 (3 pages).

Guzolek, J. and Koch, E. "Real–Time Route Planning in Road Networks", Vehicle Navigation & Information Systems–Conference Record of Papers presented at the First Vehicle Navigation and Information Systems Conference (VNIS'89), Compiled and edited by D.H.M. Reekie, E.R. Case and J. Tsai.

* cited by examiner

Primary Examiner—Bernarr E. Gregory
(74) Attorney, Agent, or Firm—Akin, Gump, Strauss, Hauer & Feld, L.L.P.

(57) ABSTRACT

To cope with differences in the evaluation depending on the user, or depending on the situation, by making it possible to alter the evaluation values used for automatically searching for the route, in a navigation system, which has a map reproduction means 4 storing segment data such as the distance and the road type, of the road segment forming a road network, a RAM 6 for storing the evaluation values corresponding to the segment data, and a control circuit 1 for searching for the route from a starting point to a destination, in accordance with a synthetic evaluation function using, as parameters, the evaluation values stored in the RAM 6, a setting means 7 is provided for altering the evaluation values stored in the RAM 6.

3 Claims, 3 Drawing Sheets

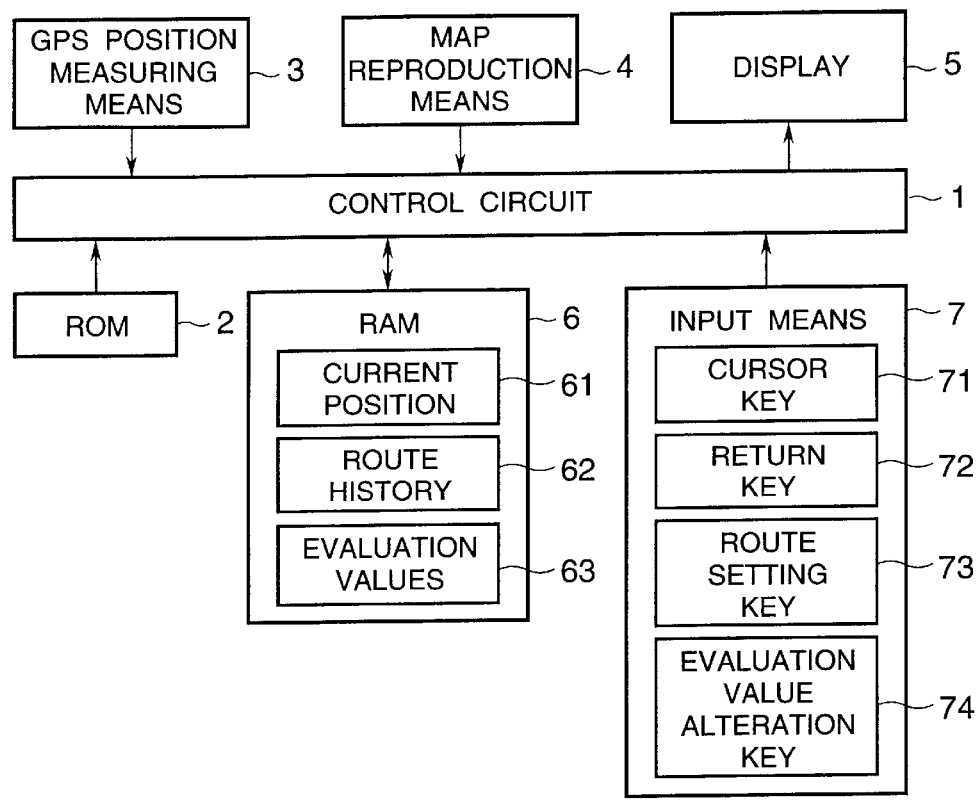

NAVIGATION SYSTEM

BACKGROUND OF THE INVENTION

The present invention relates to a navigation system for searching for or determining the route from a starting point to a destination.

Many of the navigation systems commercially available are provided with a route searching function (see Japanese Patent Kokai Publication No. 01138409). According to this function, when a starting point and a destination are set by an input means or a current position detecting means, calculation for synthetic evaluation is made using, as parameters, the evaluation values of each road segment corresponding to the distance, the number of lanes, the road type, and the like, and the route with the best evaluation is displayed. For instance, the evaluation value for the distance is represented by Kn (Kn=10 when the distance is 10 Km), the evaluation value for the number of lanes is represented by Nn (Nn=100 for a road of a single lane, Nn=70 for a road with two lanes, Nn=50 for a road with three lanes, Nn=40 for a road-with four lanes), and the evaluation value for the type of the road is represented by Dn (Dn=2 for a highway, Dn=3 for a national road, Dn=6 for main local road, Dn=24 for other local loads). n denotes the segment number of each route. The synthetic evaluation is calculated for each of a plurality of routes from the starting point to the destination, by $$\Sigma(Kn \cdot Nn \cdot Dn),$$

and the route having the smallest (best) synthetic evaluation is displayed being high-lighted.

However, there was a problem in that the evaluation thus determined is not necessarily optimum depending on the user, or depending on the situation. For example, some users may take the difference between a two-lane road and a three-lane road to be more significant. Also when in a hurry, the merit of the high way is increased, while when one has a plenty of time, the merit of a high way is not so high. Relying on the same evaluation under these different situations is therefore not proper.

SUMMARY OF THE INVENTION

The invention has been made in view of the above, and the navigation system of the invention according to the invention has

- a storage medium for storing segment data of the type of the road, and the distance of the road segment forming a road network,
- a memory means for storing evaluation values corresponding to the segment data, a route search means for searching for the route from the starting point to a destination, in accordance with a synthetic evaluation function using, as parameters, the evaluation values stored in said memory means, and further comprises
  setting means for altering the evaluation-values stored in said memory means.

The setting means may comprise an evaluation value alteration key, and a control circuit responsive to manipulation of the evaluation value alteration key to alter the evaluation values stored in said memory means.

The segment data includes the data representing a distance, a road type, and the number of lanes.

BRIEF DESCRIPTION OF THE DRAWINGS

FIG. 1 is a block diagram showing the pertinent parts of the structure of an embodiment of the invention;

FIG. 2A and FIG. 2B are tables showing evaluation values in the embodiment;

DETAILED DESCRIPTION OF THE PREFERRED EMBODIMENTS

Figure 3:
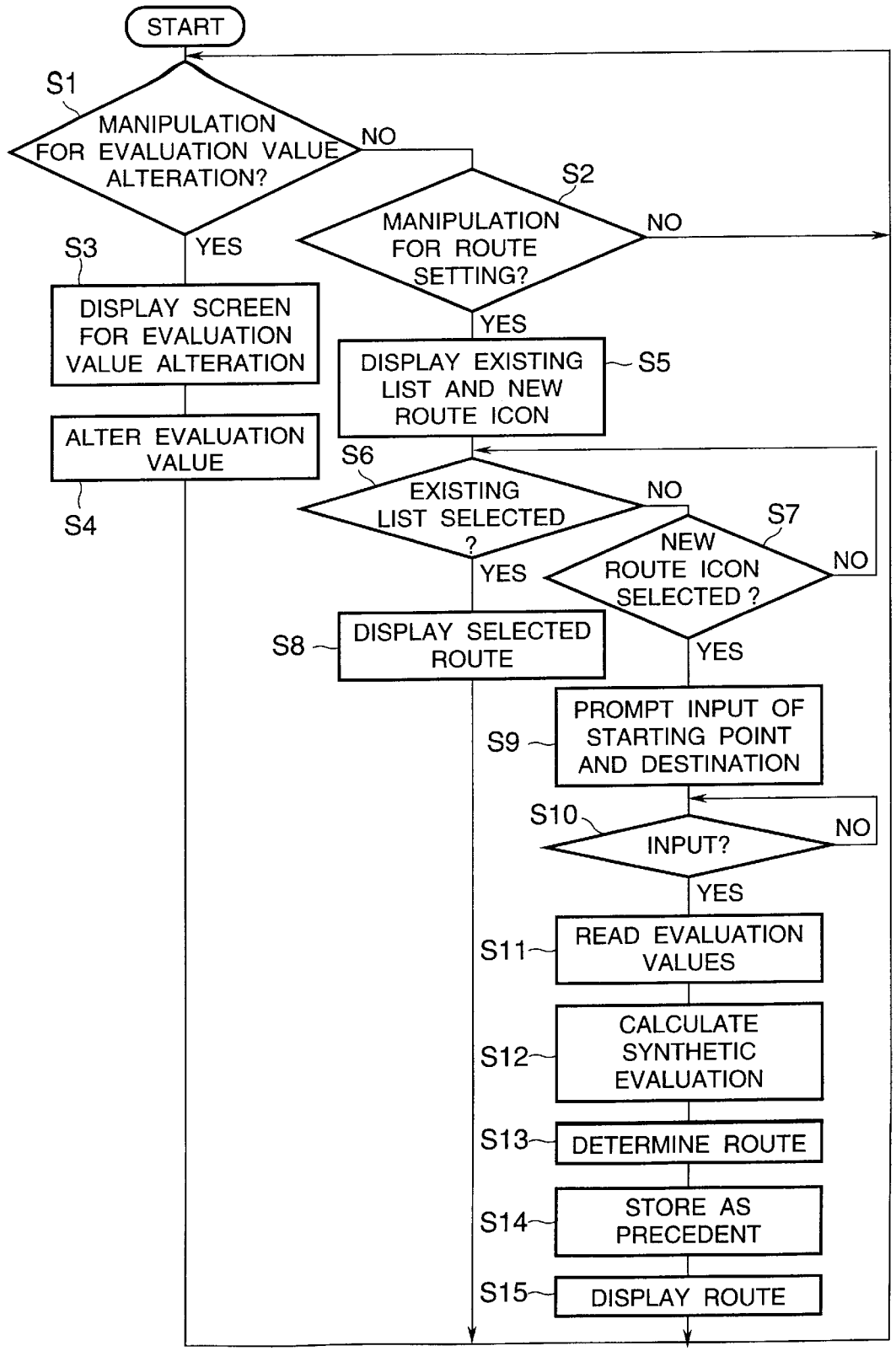
FIG. 3 is a flow chart showing the main operations of the embodiment.

An embodiment of the invention will now be described with reference to the drawings. FIG. 1 is a block diagram showing pertinent parts of an embodiment of the invention. Reference numeral 1 denotes a control circuit, which operates according to programs stored in ROM 2 to control the entire system. Reference numeral 3 denotes a GPS (global positioning system) positing measuring means, which receives electromagnetic wave from GPS satellites, and measures the current position, and supplies the measurement data to the control circuit 1.

Reference numeral 4 denotes a map reproduction means, which reads map information from a CD-ROM in which map information is recorded, and supplies the map information to the control circuit 1. The map information is divided into a plurality of block groups, and each block group is divided into layers of road network, intersections, names of the place, names of transportation network, such as railroads, and buildings, and the like. The road network layer is divided into segments at every intersections. The road segments are classified into high-ways, national roads, main local roads and other local roads. For each road segment, the distance, the direction, the time taken to drive, the width of the road, the number of lanes, and the average intervals of traffic signals, and other appendant data are stored (Japanese Patent Kokai Publication No. 01138409).

Reference numeral 5 denotes a display means, which displays the map, the current position and the like under control by the control circuit 1. Reference numeral 6 denotes a RAM (random access memory), which stores the data necessary for the operation of the control circuit 1, such as the current position 61, detected by the GPS measuring means 3, the route history 62 (starting points, destinations, routes) including the actual route which the user has run along, and the planned routes set in the past, and the evaluation values 63 used for the calculation for searching for the route (see FIG. 2A and FIG. 2B).

Reference numeral 7 denotes an input means, which includes a cursor key 71 for scrolling the screen in eight directions, a return key 72 for causing the output of data to the control circuit 1, a route setting key 73 for setting the planned route, and an evaluation value alteration key 74 for altering the evaluation values.

The main operations of the invention will next be described. FIG. 3 is a flowchart showing the operation of the control circuit 1. The control circuit 1 monitors to see whether the evaluation value alteration key 74 has been manipulated, or whether the route setting key 73 has been manipulated (S1, S2).

When it is found that the evaluation value alteration key 74 has been manipulated at the step S1, the control circuit 1 causes a screen for altering the evaluation values for the segment data, such as the number of lanes, and the types of roads (S3), and causes rewriting in the RAM 6 of the evaluation values having been altered by the manipulation of the cursor key 71 and the return key 76 (S4). FIG. 2A and FIG. 2B show an example of alteration made when the user wants to reach the destination as early as possible. It is seen that the high ways and the number of lanes are taken as more significant than with the initial values.

In this way, the evaluation values used for the calculation for the search can be altered according to the situation or according to the user.

When it is found that the route setting key 73 has been manipulated at the step S2, the control circuit 1 causes display of a list of the existing route history stored in the RAM 6, and an icon for newly setting a planned route (S5). The user then input to indicate whether one of the existing routes is selected, or the planned route is newly set.

When one of the existing routes is selected ("Y" at S6) the selected route is displayed (S8).

When the new route is selected ("Y" at S7), a screen for prompting input of the starting point and the destination is displayed (S9). When the starting point and the destination are input ("Y" at S10), the evaluation values for the road segment data such as the number of lanes and the type of the road are read (S11), and the synthetic evaluation of each route from the starting point to destination is calculated using the evaluation values having been read (S12).

The routes for which the evaluation is made are limited to those satisfying certain conditions. For instance a route including a road segment which is more than 120 degrees with respect to the direction from the starting point to destination (i.e., the road segment which leads the user farther away from the destination) is excluded.

Figure 4:
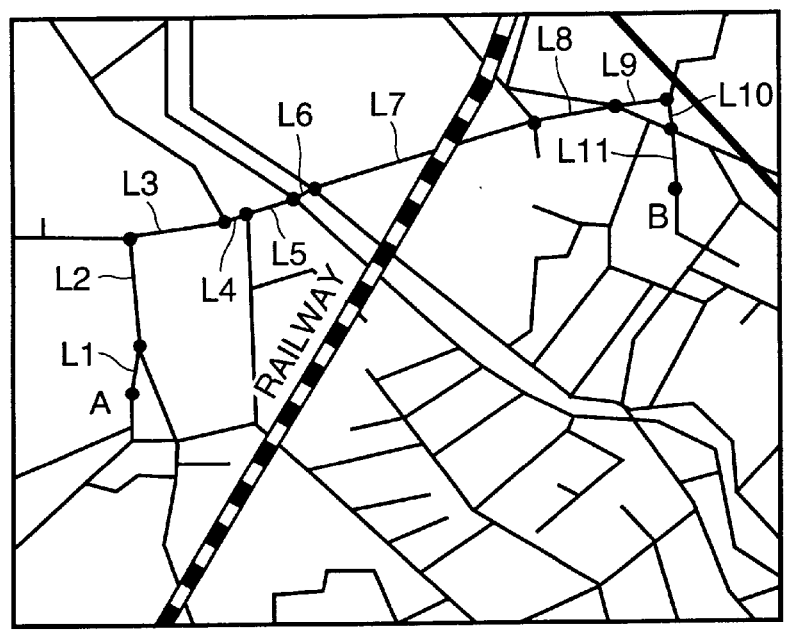
FIG. 4 is a diagram showing a starting point and a destination.
Figure 5:
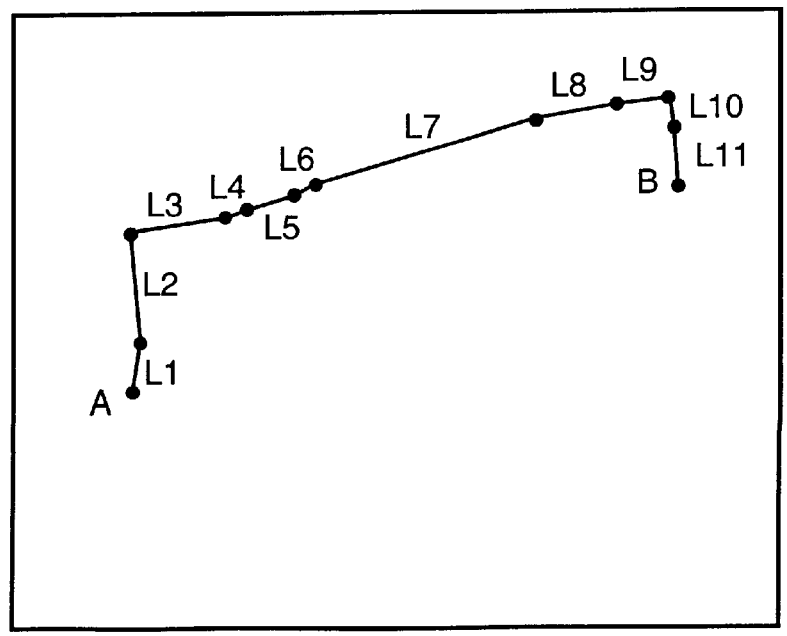
FIG. 5 is a diagram showing a route used for an example of calculation of the synthetic evaluation in the embodiment.

In the calculation of the synthetic evaluation of each route, the evaluation values of the road segment data of the respective road segments are multiplied, and summed up. As an example, in the search for a route from the starting point A to destination B shown in FIG. 4, calculation of the synthetic evaluation of the route consisting of road segments L1 to L11 is made. For simplicity of description, only the distance, the number of lanes, and the type of the roads are used as the road segment data for the synthetic evaluation. The segment data for the distance, the number of lanes, and the type of the road of the road segment Ln (n=1 to 11) are respectively denoted by $K_n$, $N_n$ and $D_n$. For instance, L3 is 5 km long, has two lanes, and is a national road, so that K3=5, N3=50, D3=3, and the synthetic evaluation of L3 is 5×50×3=750. The synthetic evaluation of each of L1 to L11 is determined in this way, and the synthetic evaluations of all of L1 to L11 are summed up to determine the synthetic evaluation of the route from A to B (the synthetic evaluation=$\Sigma(K_n \times N_n \times D_n)$.

In this way, the synthetic evaluation of each route is calculated (S12), and the route having the smallest (best) synthetic evaluation is selected (S13). The selected route and the starting point and the destination are stored in the RAM 6 as a precedent (S14). The selected route is displayed with a certain color (S15). The route having been stored as the precedent can be displayed at the above mentioned step S8 when desired by the user.

In the above embodiment, the synthetic evaluation of the route is determined based on the distance, the number of lanes, and the road type, according to $\Sigma(K_n \times N_n \times D_n)$.

However, the evaluation may be made on road segment data other than the distance, the number of lanes and the road type. For instance, the average running speed, traffic regulations, or average intervals between traffic signals may be used. The formula used for the determination of the synthetic evaluation may be other than $\Sigma(K_n \times N_n \times D_n)$, and may be $\Sigma$(coefficient No. 1×$K_n$+coefficient No. 2×$N_n$+coefficient No. 3×$D_n$).

This applies to segment data other than $K_n$, $N_n$ and $D_n$, and the coefficients may be altered.

As has been described, according to the invention, the evaluation values for automatically searching for the route can be altered by the user, so that it is possible to cope with the difference in the evaluation by the user, and the difference in the evaluation depending on the situation. For instance, it is possible to cope with the user who takes the difference between a two-lane road and a three-lane road significant, and the situation in which the user is in a hurry so that the merit of a high way is significant, and a situation in which the user has a plenty of time so that the merit of a high way is not so high.

What is claimed is:

1. A navigation system comprising:
   a map reproduction means for storing segment data of the type of the road, and the distance of the road segment forming a road network,
   a memory means for storing evaluation values corresponding to the segment data,
   a route evaluation means for searching for the route from the starting point to a destination, in accordance with a synthetic evaluation function based on the segment data and, using as parameters, the evaluation values stored in said memory means,
   input means for inputting values to be used as the evaluation values; and
   setting means for altering the evaluation values stored in said memory means by setting the input values as said evaluation values.

2. The navigation system according to claim 1, wherein said input means comprises an evaluation value alteration key, and a control circuit responsive to manipulation of the evaluation value alteration key to alter the evaluation values stored in said memory means.

3. The navigation system according to claim 1, wherein said segment data includes the data representing a distance, a road type, and the number of lanes.

* * * * *